United States Patent
Yoshida et al.

Patent Number: 5,691,854
Date of Patent: Nov. 25, 1997

[54] ZOOM LENS WITH DIFFERENTIAL FOCAL COMPENSATION FOR VISIBLE, IR, AND UV LIGHT

[75] Inventors: Shigeru Yoshida; Hitoshi Miyano, both of Omiya, Japan

[73] Assignee: Fuji Optical Co., Ltd., Omiya, Japan

[21] Appl. No.: 531,053

[22] Filed: Sep. 20, 1995

[30] Foreign Application Priority Data

Sep. 27, 1994 [JP] Japan .................. 6-231819

[51] Int. Cl.$^6$ .................. G02B 7/02; G02B 15/14
[52] U.S. Cl. .................. 359/823; 359/824; 359/696
[58] Field of Search .................. 359/696, 697, 359/823, 824

[56] References Cited

U.S. PATENT DOCUMENTS

| | | |
|---|---|---|
| 4,976,523 | 12/1990 | Ishikawa .................. 359/696 |
| 5,016,993 | 5/1991 | Akitake .................. 359/696 |
| 5,144,491 | 9/1992 | Ushiro .................. 359/697 |
| 5,172,276 | 12/1992 | Ueyama .................. 359/813 |

*Primary Examiner*—David C. Nelms
*Assistant Examiner*—Ricky Mack
*Attorney, Agent, or Firm*—Sixbey, Friedman, Leedom & Ferguson; David S. Safran

[57] ABSTRACT

To use a zoom lens mechanism in visible light, a switch is turned off. By force of a spring, a cam pin of a correction lens is contacted with a first edge of a cam groove which is formed to have a shape which corrects a focal inadequacy resulting from a movement of a variable magnification lens in visible light. Accordingly, the movement of the correction lens is controlled by the first edge. To use the zoom lens mechanism in near infrared light, the switch is turned on. By magnetic force of an electromagnet, the cam pin is contacted with a second edge of the cam groove which is formed to have a shape which corrects the focal inadequacy resulting from the movement of the variable magnification lens in near infrared light. Accordingly, the movement of the correction lens is controlled by the second edge.

8 Claims, 4 Drawing Sheets

ZOOM LENS WITH DIFFERENTIAL FOCAL COMPENSATION FOR VISIBLE, IR, AND UV LIGHT

BACKGROUND OF THE INVENTION

1. Field of the Invention

The present invention relates to a zoom lens mechanism and more particularly to a zoom lens mechanism which is applied to a surveillance camera.

2. Description of the Related Art

In a conventional zoom lens mechanism of a mechanical compensation type, a variable magnification lens and a correction lens are respectively moved by a cam mechanism, and a focal inadequacy which is caused by a movement of the variable magnification lens is corrected by means of a movement of the correction lens.

However, the movement of the correction lens is controlled so as to correct the focal inadequacy caused by the movement of the variable magnification lens within a wavelength area of visible light (an electromagnetic wave of 380 nm–780 nm). Therefore, when the mechanism is used in a wavelength area of infrared light (780 nm–$10^5$ nm), there is a disadvantage in that the focal inadequacy is unavoidable because of a color difference caused by a difference of the wavelength.

SUMMARY OF THE INVENTION

The present invention has been developed in view of the above-described circumstances, and has as its aim the provision of the zoom lens mechanism in which a focal inadequacy can be avoided not only in a first wavelength area but also in a second wavelength area of light.

To achieve the above-mentioned object, a zoom lens mechanism of the present invention comprises a zoom lens barrel, a variable magnification lens part which is supported within the zoom lens barrel, a correction lens part which is supported within the zoom lens barrel, a first control means for controlling a movement of the correction lens part in a first wavelength area of light, a second control means for controlling a movement of the correction lens part in a second wavelength area of light, and a switching means for selectively making the first control means or the second control means work.

The variable magnification lens part is supported within the zoom lens barrel in such a manner to be movable forward and backward along an optical axis. The correction lens part is also supported within the zoom lens barrel in such a manner to be movable forward and backward along an optical axis. By the correction lens part, the focal inadequacy resulting from a movement of the variable magnification lens part is corrected. The first control means controls a movement of the correction lens part so as to correct the focal inadequacy resulting from the movement of the variable magnification lens part in the first wavelength area of light. The second control means controls the movement of the correction lens part so as to correct the focal inadequacy resulting from the movement of the variable magnification lens part in the second wavelength area of light.

In the above-described zoom lens mechanism, when the first control means is made to work, the movement of the correction lens part is controlled by the first control means, so that focal inadequacy resulting from the movement of the variable magnification lens in the first wavelength area of light can be corrected. Moreover, when the second control means is made to work, the movement of the correction lens part is controlled by the second control means, so that the focal inadequacy resulting from the movement of the variable magnification lens part in the second wavelength area of light can be corrected. As a result, in the zoom lens mechanism of the present invention, a good focal point can be obtained not only in the first wavelength area but also in the second wavelength area of light.

Furthermore, to achieve the above-mentioned object, another zoom lens mechanism of the present invention comprises a zoom lens barrel, a variable magnification lens part supported within the zoom lens barrel, a correction lens part supported within the zoom lens barrel, a cylindrical cam supported within the zoom lens barrel, a first cam groove for variable magnification formed on the cylindrical cam, a second cam groove for correction formed on the cylindrical cam, which has first and second edges, a switching means for selectively contacting a second cam pin of the correction lens part with the first edge or the second edge.

The variable magnification lens part is supported within the zoom lens barrel in such a manner to be movable forward and backward along an optical axis. The correction lens part moves forward and backward along an optical axis within the zoom lens barrel so as to correct the focal inadequacy resulting from the movement of the variable magnification lens part. The cylindrical cam is able to rotate on the optical axis within the zoom lens barrel. The first cam groove for variable magnification is formed on the cylindrical cam. A first cam pin which is provided in the variable magnification lens part is engaged with the first cam groove. The variable magnification lens part moves along the first cam groove. The second cam groove for correction is formed on the cylindrical cam, and the second cam pin which is provided in the correction lens part is engaged with the second cam groove. The second cam groove has the first and second edges. The first edge on one side of the second cam groove is formed to have a shape which corrects the focal inadequacy resulting from the movement of the variable magnification lens part in the first wavelength area of light. The second edge facing the first edge is formed to have a shape which corrects the focal inadequacy resulting from the movement of the variable magnification lens part in the second wavelength area of light. The switching means selectively contacts the second cam pin of the correction lens part with the first edge or the second edge.

In this zoom lens mechanism, when the second cam pin of the correction lens part is contacted with the first edge of the second cam groove for correction of the cylindrical cam by the switching part, the correction lens part moves along the first edge. As a result, the focal inadequacy resulting from the movement of the variable magnification lens can be corrected in the first wavelength area of light. When the second cam pin of the correction lens part is contacted with the second edge of the second cam groove for correction of the cylindrical cam by the switching part, the correction lens part moves along the second edge. As a result, the focal inadequacy resulting from the movement of the variable magnification lens can be corrected in the second wavelength area of light. Accordingly, in the zoom lens mechanism of the present invention, a good focal point can be obtained in the first wavelength area of light and the second wavelength area of light.

As the first wavelength area of light, a wavelength area of visible light can be considered. As the second wavelength area of light, a wavelength area of infrared light can be considered. As a result, a good focusing can be performed in the wavelength area of visible light and the wavelength areas of infrared light.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein.

DESCRIPTION OF THE PREFERRED EMBODIMENT

Detailed description will hereunder be given of the preferred embodiment of a zoom lens mechanism according to the present invention with reference to the accompanying drawings.

Figure 1:
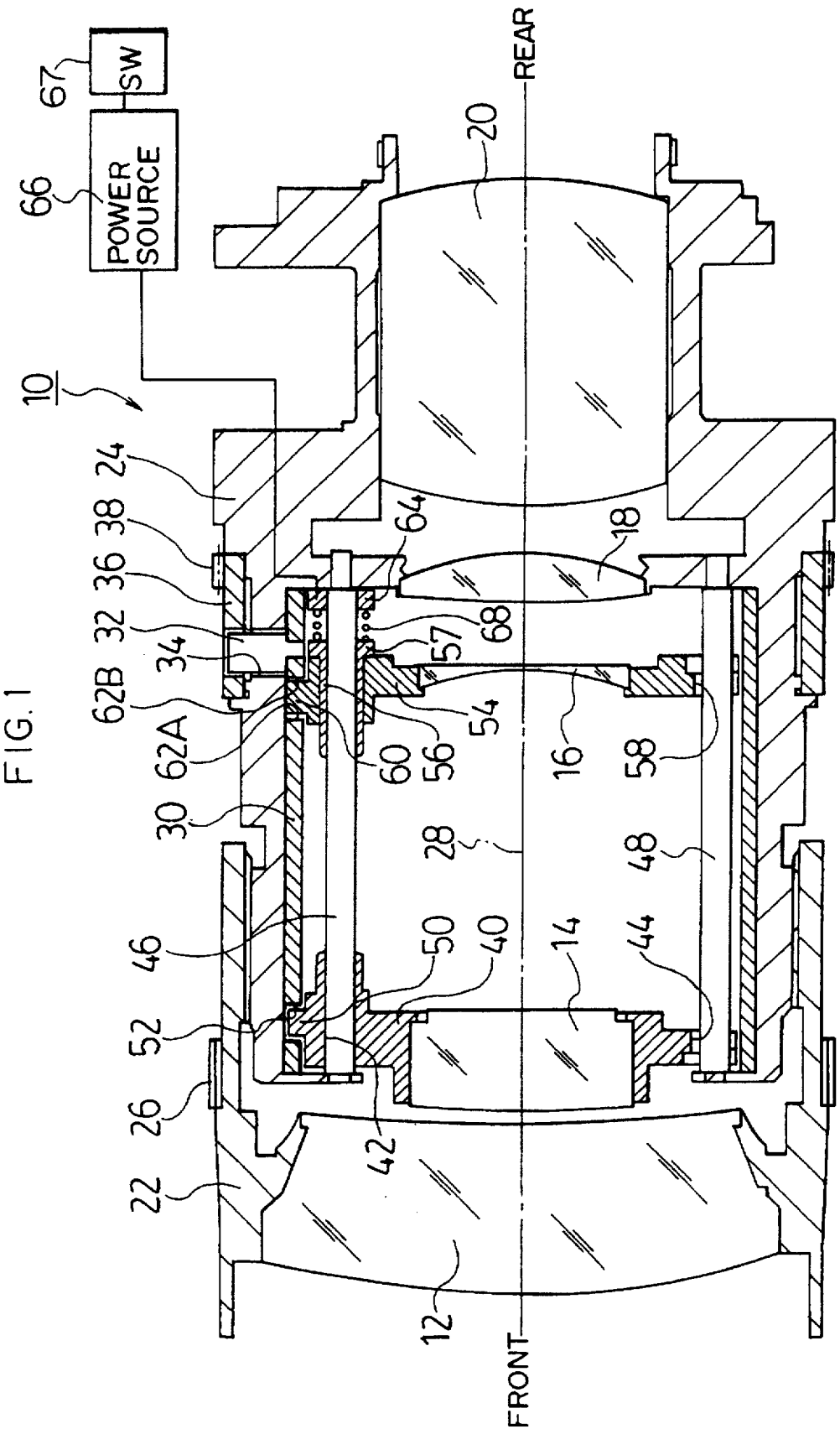
FIG. 1 is a sectional view illustrating an embodiment of a zoom lens mechanism according to the present invention.

FIG. 1 is a sectional view illustrating a zoom lens mechanism of the embodiment according to the present invention. In the zoom lens mechanism 10, a focus lens 12 is arranged in front of the zoom lens mechanism 10, and a variable magnification lens 14, a correction lens 16 and relay lenses 18 and 20 are arranged at the rear of the focus lens 12. The focus lens 12 is held by a focus ring 22. An internal thread is formed on an internal peripheral surface at the rear end of the focus ring 22 and an external thread is formed on an external peripheral surface at the front end of a zoom lens barrel 24, so that the zoom lens barrel 24 is screwed into the focus ring 22. A focus gear 26 is provided on an external peripheral surface of the focus ring 22 so as to exactly fit with a gear (not shown) which is connected to a drive motor (not shown). When rotational force from the drive motor is transmitted to the focus ring 22 via the gear, the focus ring 22 is rotated on the zoom lens barrel 24 and is moved forward and backward along an optical axis 28 by a function of a thread. As a result, a focus adjustment can be carried out by means of the focus lens 12.

In the zoom lens barrel 24, a cylindrical cam 30 is provided in such a manner to be rotatable on the optical axis 28. A lower end portion of an interlocking pin 32 is secured to a rear end portion of the cylindrical cam 30, and the interlocking pin 32 is arranged in such a manner to be slidable along a groove 34, which is opened on the outer peripheral surface of the zoom lens barrel 24 in a direction perpendicular to the optical axis 28. An upper end portion of the interlocking pin 32 is secured to a zoom ring 36, which is arranged to be rotatable on the outer peripheral surface of the zoom lens barrel 24. A gear 38 is provided on the zoom ring 36. Rotational force is transmitted to the zoom ring 36 from the drive motor, which is not shown in the drawing, via the gear 38, so that the cylindrical cam 30 rotates on the optical axis 28 by means of the interlocking pin 32. The variable magnification lens 14 and the correction lens 16 are respectively provided within the cylindrical cam 30.

The variable magnification lens 14 is held by a lens holding frame 40. A hole 42 and a groove 44 are provided at the upper and lower portions of the lens holding frame 40 in parallel to the optical axis 28 as shown in FIG. 1. The lens holding frame 40 is slidably supported by guide poles 46 and 48 which pass through the hole 42 and the groove 44. Both ends of the guide poles 46 and 48 are fixed at the zoom lens barrel 24 in such a manner that the poles 46 and 48 are in parallel to the optical axis 28. Accordingly, the variable magnification lens 14 can move forward and backward in the direction of the optical axis 28. A cam pin 50 is provided on the lens holding frame 40, and the cam pin 50 is engaged with a cam groove 52 for variable magnification (refer to FIG. 2), which is formed on the cylindrical cam 30.

The correction lens 16 is held by the lens holding frame 54. A hole 56 and a groove 58 are provided at the upper and lower portions of the lens holding frame 54 to be in parallel to the optical axis 28 as shown in FIG. 1. A bush 57, which will be described later, is secured to the hole 56. The guide pole 46 passes through a bush 57 and the guide pole 48 also passes through the groove 58, so that the correction lens 16 can move forward and backward in the direction of the optical axis 28. A cam pin 60 is provided on the lens holding frame 54, and the cam pin 60 is engaged with a cam groove 62 for correction (refer to FIG. 2), which is formed in the cylindrical cam 30.

Accordingly, when the cylindrical cam 30 is rotated, the variable magnification lens 14 moves along the cam groove 52 for variable magnification, and the correction lens 16 moves along the cam groove 62 for correction. As a result, the variable magnification lens 14 and the correction lens 16 move relative to each other forward and backward along the optical axis 28. Due to this forward and backward movement, the focal distance is changed by the variable magnification lens 14, and then the focal inadequacy resulting from the movement of the variable magnification lens 14 is corrected by the correction lens 16.

Figure 2:
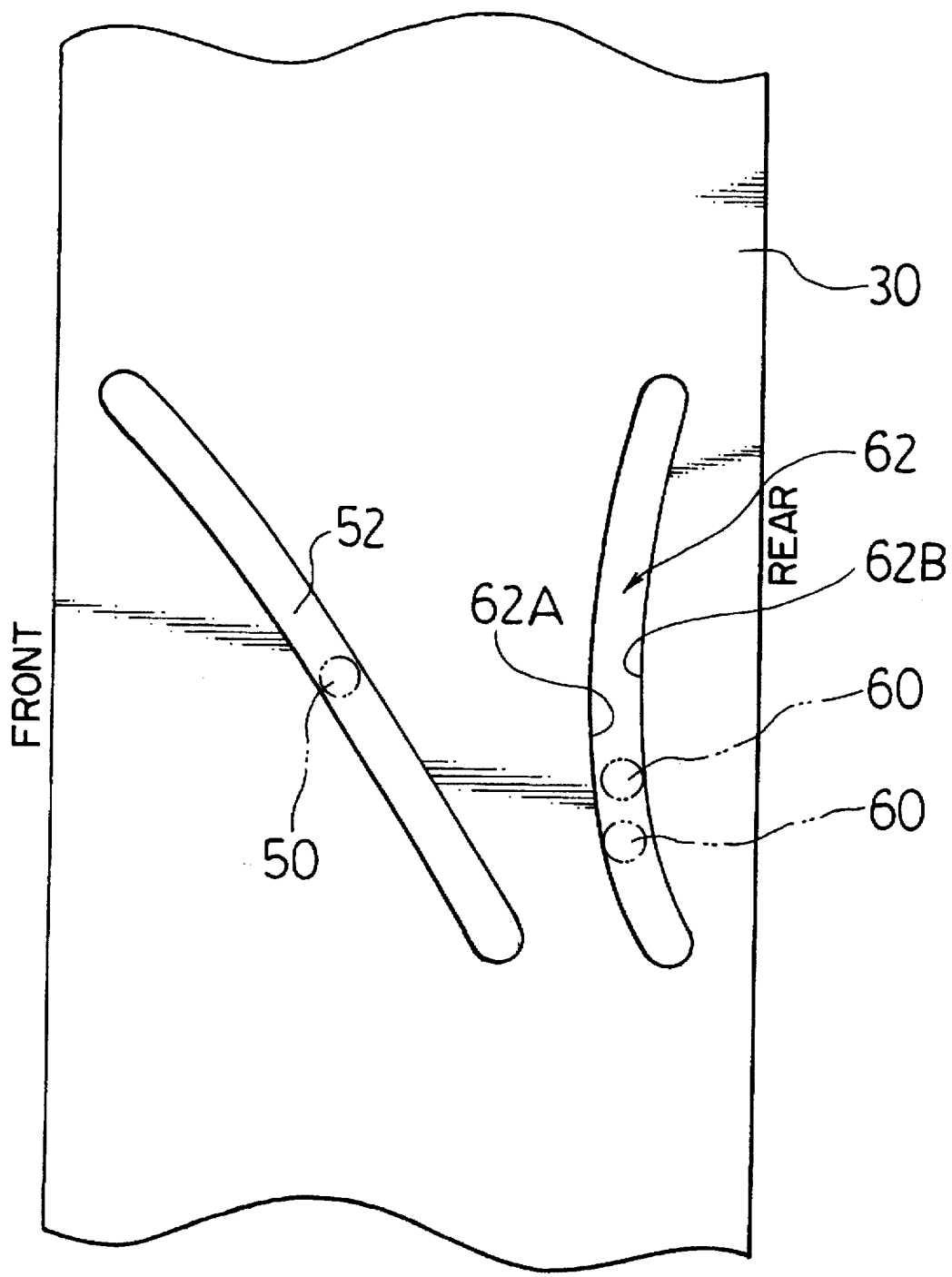
FIG. 2 is a development of a cylindrical cam which is applied to a zoom lens mechanism according to the present invention.

The cam groove 62 for correction has a wider breadth than that of the cam groove 52 for variable magnification as shown in FIG. 2, so that the cam pin 60 can move within the breadth of the cam groove 62 as shown with a two-dot chain in FIG. 2. The cam groove 62 has a front edge 62A and a rear edge 62B, which face each other. The front edge 62A, which is shown on the upper side of the cam groove 62 in FIG. 2, is formed to have a shape which corrects the focal inadequacy resulting from the movement of the variable magnification lens 14 in the first wavelength area of light, which is a wavelength area of visible light in this embodiment. On the other hand, the rear edge 62B, which is shown on the lower side of the cam groove 62 in FIG. 2, is formed to have a shape which corrects the focal inadequacy resulting from the movement of the variable magnification lens 14 in the second wavelength area of light, which is a wavelength area of near infrared light. That is, when the cam pin 60 moves along the front edge 62A, the focal inadequacy resulting from the movement of the variable magnification lens 14 in the first wavelength area of light can be corrected, and when the cam pin 60 moves along the rear edge 62B, the focal inadequacy resulting from the movement of the variable magnification lens 14 in the second wavelength area of light can be corrected.

On the other hand, the bush 57 of FIG. 1 is made of a magnetic material. An electromagnet 64 is secured to a surface of the zoom lens barrel 24 which faces the bush 57, and a power source 66 is connected to the electromagnet 64. A switch 67 is connected to the power source 66 so as to turn on and off the power source 66.

A spring 68 is provided between the bush 57 and the electromagnet 64 in such a manner that the guide pole 46 passes therethrough. The spring 68 presses the cam pin 60 against the front edge 62A of the cam groove 62 for correction via the bush 57 with its force. As a result, the correction lens 14 moves forward and backward along the front edge 62A. In the case when the switch 67 is turned on and electric power is supplied to the electromagnet 64 by the power source 66, the bush 57 is drawn by a magnetic force of the electromagnet 64 against the force of the spring 68. As a result, the cam pin 60 is contacted with the rear edge 62B of the cum groove 62 for correction, so that the correction lens 14 moves forward and backward along the rear edge 62B.

Next, an explanation will be given of the operation of the zoom lens mechanism constructed in the above-mentioned manner.

Figure 3:
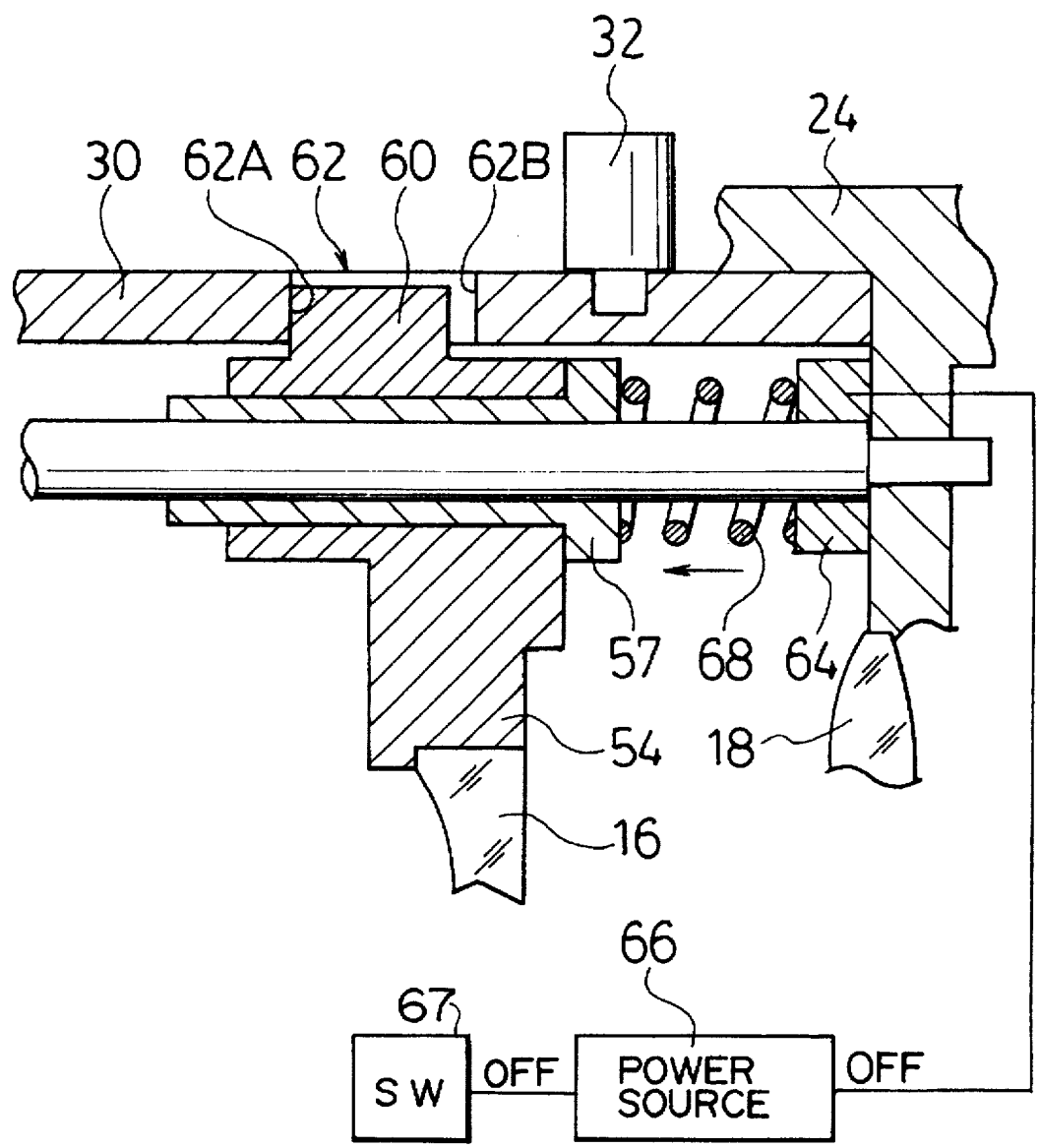
FIG. 3 is an explanatory view indicating one positional relationship between a cam pin of a correction lens and a cam groove for correction.

First, an explanation will be given of the case that the zoom lens mechanism is used in the wavelength area of visible light. When the switch 67 is turned off as shown in FIG. 3, the cam pin 60 of the correction lens 16 is contacted with the front edge 62A of the cam groove 62, which is employed for a correction under visible light, by force of the spring 68. Forward and backward movements of the correction lens 14 are controlled by the front edge 62A for visible light. As a result, the focal inadequacy resulting from the movement of the variable magnification lens 14 can be corrected in the wavelength area of visible light.

Figure 4:
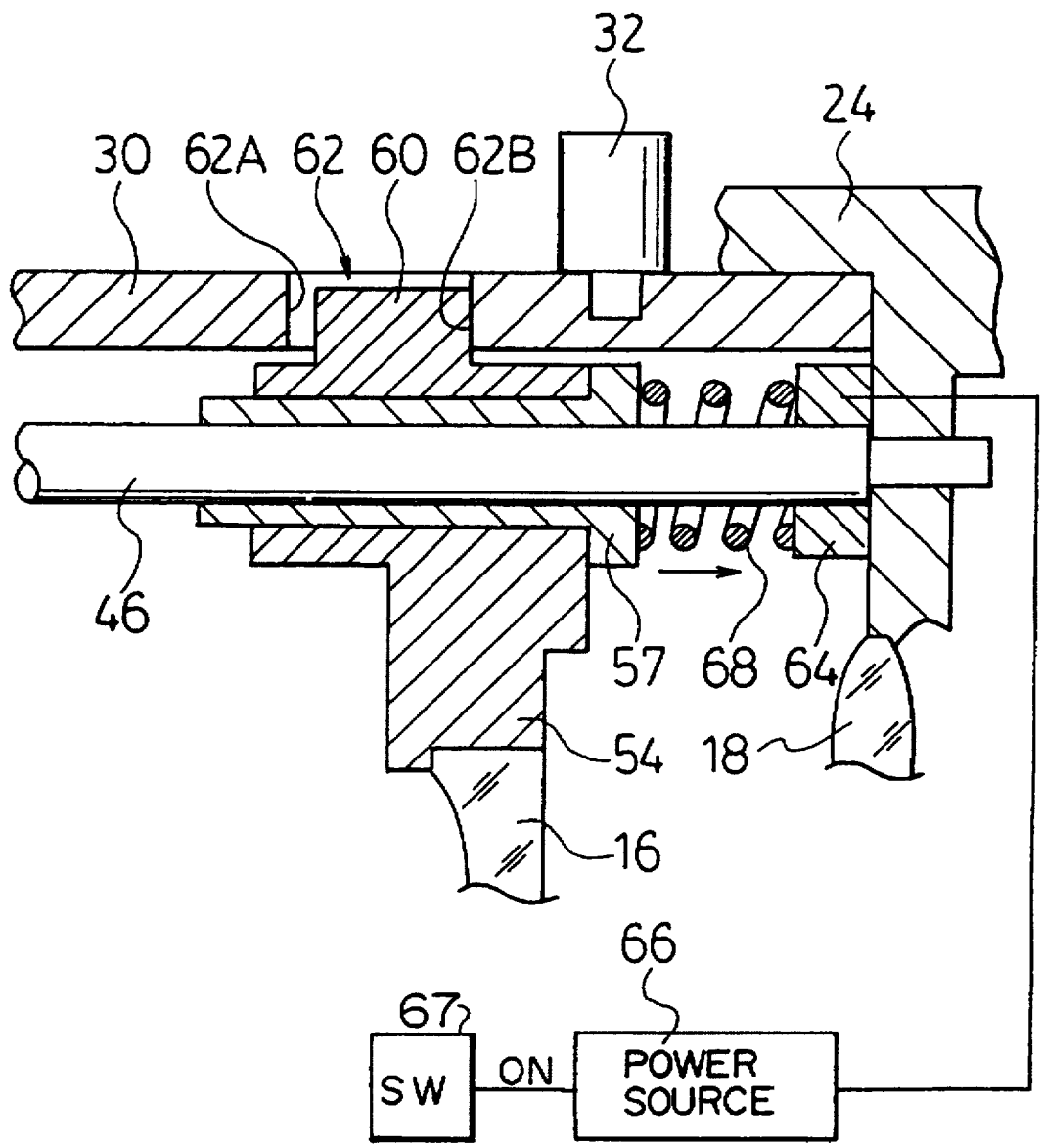
FIG. 4 is an explanatory view indicating the other positional relationship between a cam pin of a correction lens and a cam groove for correction.

Next, an explanation will be given of the case that the zoom lens mechanism is used in the wavelength area of near infrared light. When the switch 67 is turned on as shown in FIG. 4, electric power is supplied to the electromagnet 64 by the power source 66. The cam pin 60 of the correction lens 16 leaves from the front edge 62A for visible light against the force of the spring 68, and is contacted with the rear edge 62B of the cam groove 62, which is employed under near infrared light. Forward and backward movements of the correction lens 16 are controlled by the rear edge 62B for near infrared light. As a result, the focal inadequacy resulting from the movement of the variable magnification lens 14 can be corrected in the wavelength area of near infrared light.

Accordingly, in the zoom lens mechanism 10 of this embodiment, a good focal point can be obtained in the wavelength areas of both visible light and near infrared light.

In this embodiment, the explanation was given of the zoom lens mechanism of a mechanical compensation type, however, the present invention may be applied to a zoom lens mechanism of an optical compensation type.

Moreover, in this embodiment, the front edge 62A of the cam groove 62 for correction is a cam for the wavelength area of visible light, and the rear edge 62B is a cam for the wavelength area of near infrared light, however, the present invention is not limited to this. These cams may be cams for wavelength areas of far infrared light, ultraviolet light, etc.

Furthermore, in this embodiment, the cam pin 60 is moved by means of the electromagnet 64, however, the present invention is not limited to this. The cam pin 60 can be moved by a means such as a piezo-electric device, etc.

Still further, in this embodiment, the variable magnification lens 14 and the correction lens 16 are moved by rotation of the cylindrical cam 30, however, the movement of the variable magnification lens 14 and the correction lens 16 can be respectively controlled by motors.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A zoom lens mechanism, comprising:

a zoom lens barrel;

a variable magnification lens part supported within said zoom lens barrel in such a manner to be movable forward and backward along an optical axis;

a correction lens part for correcting a focal inadequacy resulting from a movement of said variable magnification lens part, which is supported within said zoom lens barrel in such a manner to be movable forward and backward along an optical axis;

first control means for controlling a movement of said correction lens part so as to correct focal inadequacy resulting from a movement of said variable magnification lens part in a wavelength area of visible light;

second control means for controlling a movement of said correction lens part so as to correct a focal inadequacy resulting from a movement of said variable magnification lens part in a wavelength area of infrared light; and switching means for selectively making said first control means or said second control means work.

2. A zoom lens mechanism, comprising:

a zoom lens barrel;

a variable magnification lens part including a first cam pin, which is supported within said zoom lens barrel in such a manner to be movable forward and backward along an optical axis;

a correction lens part including a second cam pin for correcting a focal inadequacy resulting from a movement of said variable magnification lens part, which is supported within said zoom lens barrel in such a manner to be movable forward and backward along an optical axis;

a cylindrical cam supported within said zoom lens barrel in such a manner to be rotatable on said optical axis;

a first cam groove for variable magnification formed on said cylindrical cam to be engaged with said first cam pin;

a second cam groove for correction formed on said cylindrical cam to be engaged with said second cam pin, which has a first edge on one side of said second cam groove being formed to have a shape which corrects a focal inadequacy resulting from a movement of said variable magnification lens part in a wavelength area of visible light and a second edge facing said first edge being formed to have a shape which corrects focal inadequacy resulting from a movement of said variable magnification lens part in a wavelength area of infrared light; and switching means for selectively contacting said second cam pin of said correction lens part with said first edge or said second edge.

3. The zoom lens mechanism according to claim 2, wherein said switching means comprises:

force applying means for contacting second cam pin of said correction lens part with said first edge of said second cam groove;

a magnetic substance fixed to a correction lens part;

an electromagnet attached to a zoom lens barrel in such a manner to face said magnetic substance, which contacts said second cam pin with said second edge of said second cam groove by drawing said magnetic substance by means of magnetic force thereof against a force of said force applying means when supplied electric power;

a power source for supplying electric power with said electromagnet; and a switch for turning on and off said power source.

4. The zoom lens mechanism according to claim 3, wherein said force applying means is a spring provided between said magnetic substance and said electromagnet.

5. A zoom lens mechanism, comprising:

a zoom lens barrel;

a variable magnification lens part support within said zoom lens barrel in such a manner to be movable forward and backward along an optical axis;

a correction lens part for correcting a focal inadequacy resulting from a movement of said variable magnification lens part, which is supported within a zoom lens barrel in such a manner to be movable forward and backward along an optical axis;

first control means for controlling a movement of said correction lens part so as to correct focal inadequacy resulting from a movement of said variable magnification lens part in a wavelength area of visible light;

second control means for controlling a movement of said correction lens part so as to correct a focal inadequacy resulting from a movement of said variable magnification lens part in a wavelength area of ultraviolet light; and switching means for selectively making said first control means or said second control means work.

6. A zoom lens mechanism, comprising:

a zoom lens barrel;

a variable magnification lens part including a first cam pin, which is supported within said zoom lens barrel in such a manner to be movable forward and backward along an optical axis;

a correction lens part including a second cam pin for correcting a focal inadequacy resulting from a movement of said variable magnification lens part, which is supported within said zoom lens barrel in such a manner to be movable forward and backward along an optical axis;

a cylindrical cam supported within said zoom lens barrel in such a manner to be rotatable on said optical axis;

a first cam groove for variable magnification formed on said cylindrical cam to be engaged with said first cam pin;

a second cam groove for correction formed on said cylindrical cam to be engaged with said second cam pin, which has an first edge on one side of said second cam groove being formed to have a shape which corrects a focal inadequacy resulting from a movement of said variable magnification lens part in a wavelength area of visible light and a second edge facing said first edge being formed to have a shape which corrects focal inadequacy resulting from a movement of said variable magnification lens part in a wavelength area of ultraviolet light; and switching means for selectively contacting said second cam pin of said correction lens part with said first edge or said second edge.

7. The zoom lens mechanism according to claim 6, wherein said switching means comprises:

force applying means for contacting second cam pin of said correction lens part with said first edge of said second cam groove;

a magnetic substance fixed to a correction lens part;

an electromagnet attached to a zoom lens barrel in such a manner to face said magnetic substance, which contacts said second cam pin with said second edge of said second cam groove by drawing said magnetic substance by means of magnetic force thereof against a force of said force applying means when supplied electric power;

a power source for supplying electric power with said electromagnet; and a switch for turning on and off said power source.

8. The zoom lens mechanism according to claim 7, wherein said force applying means is a spring provided between said magnetic substance and said electromagnet.

* * * * *